United States Patent [19]

Teraura

[11] 4,292,859
[45] Oct. 6, 1981

[54] STEERING DEVICE

[75] Inventor: Makoto Teraura, Takarazuka, Japan

[73] Assignee: Nippon Cable System Inc., Takarazuka, Japan

[21] Appl. No.: 71,231

[22] Filed: Aug. 30, 1979

[30] Foreign Application Priority Data

Jan. 24, 1979 [JP] Japan .................................. 54-7962

[51] Int. Cl.³ .............................................. F16C 1/18
[52] U.S. Cl. ................... 74/501 R; 74/505; 74/496
[58] Field of Search ............. 74/501 R, 501 P, 480 B, 74/487, 489, 496, 505, 506; 308/6 R, 20

[56] References Cited

U.S. PATENT DOCUMENTS

| 2,400,374 | 5/1946 | Selnes | 308/6 R |
| 2,810,062 | 10/1957 | Kaunitz | 308/6 R |
| 2,890,595 | 6/1959 | Loeffler | 74/501 R X |
| 3,024,073 | 3/1962 | Krueger | 308/6 R |
| 3,110,193 | 11/1963 | Bratz | 74/501 R |
| 3,118,321 | 1/1964 | Rinke | 74/487 X |
| 3,258,989 | 7/1966 | Frese et al. | 74/501 R |
| 3,349,637 | 10/1967 | Moore | 74/501 R |
| 3,771,384 | 11/1973 | Hackman | 74/501 R X |
| 4,029,367 | 6/1977 | Schwede et al. | 308/6 R |

FOREIGN PATENT DOCUMENTS

| 624730 | 5/1935 | Fed. Rep. of Germany | 74/501 |
| 514771 | 11/1939 | United Kingdom | 74/501 |

Primary Examiner—Kenneth Dorner
Attorney, Agent, or Firm—Armstrong, Nikaido, Marmelstein & Kubovcik

[57] ABSTRACT

In a steering device having an expansion and contraction-durable, flexible inner wire of a control cable, one end of which is fastened to an outer peripheral surface of a disc drive member rotatably mounted in a casing, the inner wire is fitted into an annular groove provided in the periphery of the drive member, and in a gap between the periphery of the drive member and the inner surface of the casing there is placed a series of bearings located or pivoted by a prescribed length of a flexible separator and having an engaging means capable of engaging with the inner wire or the drive member only in the direction of winding the inner wire. As a result of this construction, the steering device can be lightly operated regardless of the direction of rotation of a steering wheel.

3 Claims, 11 Drawing Figures

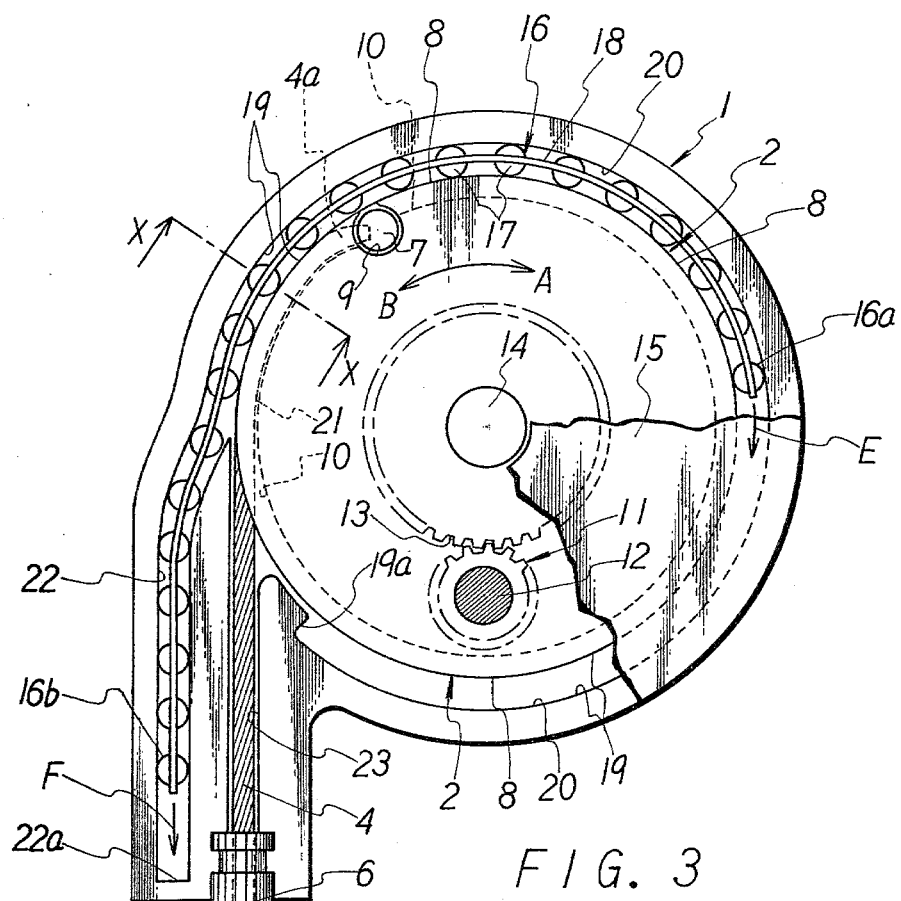
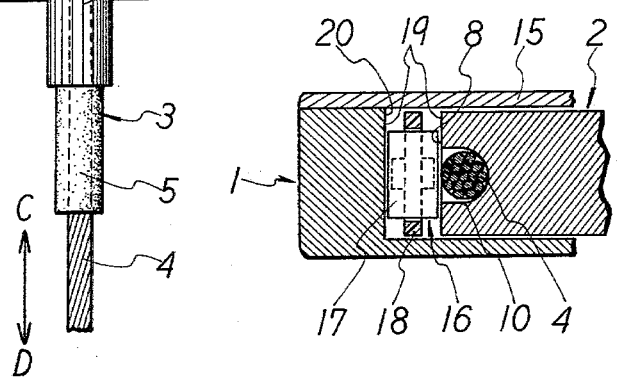

STEERING DEVICE

BACKGROUND OF THE INVENTION

The present invention relates to a novel steering device suited for use in boats, and more particularly to a steering device constructed so as to be lightly operated regardless of the rotation direction of a steering wheel.

A conventional steering device of this type is provided, for instance, as shown in FIG. 1, with a disc drive member 26 rotatably mounted in a casing 25 and an expansion and contraction-durable, flexible inner wire 27, one end 27a of which is fastened to an outer peripheral surface of the drive member 26, and is so constructed as to actuate a rudder means connected to the other end of the inner wire 27 by turning a steering wheel (not shown) to rotate a pinion 28 whereby a drive member 26 having a gear 29 meshed with the pinion 28 is rotated to wind or unwind the inner wire 27 into or out of the casing. When the drive member 26 rotates to wind the inner wire 27, the inner wire 27 contacts closely with the periphery of the drive member 26 and scarcely contacts slidingly with the inner surface of the casing 25, since the pull load acts on the inner wire 27. However, when the drive member 26 is rotated in the reverse direction to unwind the inner wire 27, the inner wire 27 separates from the periphery of the drive member 26 and contacts with the inner surface of the casing 25 to cause frictional drag and, accordingly, the steering device of this type has the disadvantage that the turning of the steering wheel becomes heavy and a boat is steered with difficulty.

In order to eliminate this disadvantage, it is also proposed to locate bearings between the inner surface of the casing and the inner wire, each of the bearings being rotatably mounted on a large number of pins fixed to the casing, or as shown in FIG. 1, to secure a lubricating member 30 of plastic material having an excellent lubricating property to the inner surface of the casing 25. However, the former has the defect that the frictional resistance is not sufficiently decreased, despite of requiring much labor in the preparation of the steering device. Also, the latter has the defect that the gap between the drive member 26 and the lubricating member 30 becomes large during use for a short period of time due to abrasion of the lubricating member 30, so the inner wire 27 causes backlash, and as a result, a rudder swings on sail in spite of no rotation of the wheel and a boat moves in a zigzag direction.

Like this, there has not been known a steering device which can sufficiently eliminate the defect of change in light and heavy of steering depending on the rotation directions of the steering wheel with simple construction and with low cost.

SUMMARY OF THE INVENTION

It is a primany object of the present invention to provide a steering device which can be lightly operated regardless of the direction of rotation of a steering wheel.

A further object of the present invention is to provide a steering device which can be easily assembled.

A still further object of the present invention is to provide a steering device which is durable for use for a long term.

These and other objects of the present invention will become more apparent from the following description taken in connection with the accompanying drawings.

In accordance with the present invention, there is provided a steering device having a disc drive member rotatably mounted in a casing and an expansion and contraction-durable, flexible inner wire one end of which is fastened to the outer peripheral surface of said drive member, said device being improved in that (a) said inner wire is fitted into an annular groove provided in the outer peripheral surface of said disc drive member, (b) a series of bearings located or pivoted by a proper length of a flexible separator is interposed in a gap between the outer peripheral surface of said disc drive member and the inner surface of said casing, (c) one end of the series of bearings is at substantially the same position as the fastening position of said inner wire, when the inner wire is completely wound in said groove about said drive member, (d) the other end of the series of bearings is able to enter into a guide path which is provided in said casing so that the series of bearings separates from said inner wire at near a tangential contact position of the inner wire with said drive member, and (e) the series of bearings is provided with an engaging means at its one end, said engaging means being able to engage with an engaging means provided on said one end of the inner wire or said drive member only in the direction of winding the inner wire.

BRIEF DESCRIPTION OF THE DRAWINGS

FIG. 2 is a partially cutaway plan view showing an embodiment of the steering device of the present invention;

FIG. 3 is a cross sectional view taken on line X—X of FIG. 2;

DETAILED DESCRIPTION

Figure 1:
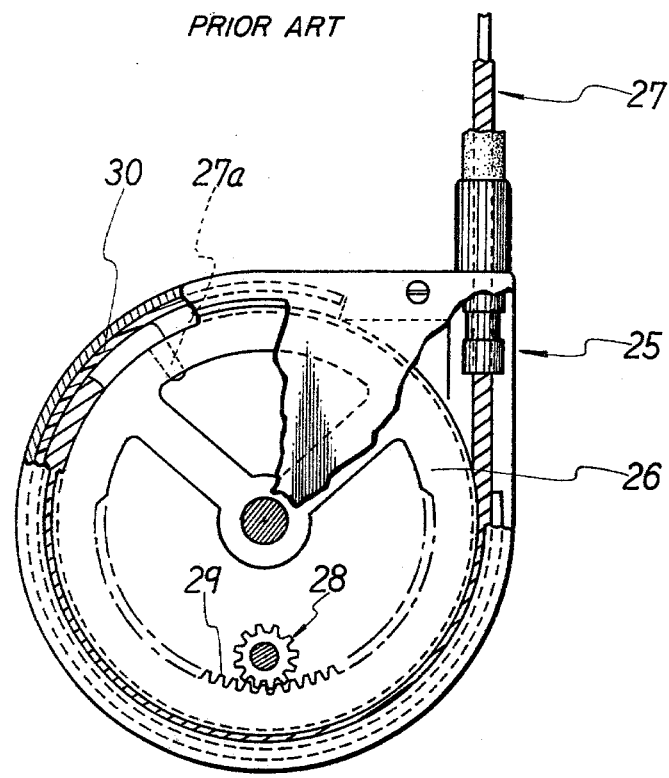
FIG. 1 is a partially cutaway plan view showing a conventional steering device.

The steering device of the present invention will be explained with reference to the drawings.

In FIGS. 2 and 3, reference numeral 1 is a casing, and reference numeral 2 is a disc drive member. Reference numeral 3 is a control cable (hereinafter referred to as "cable") and is in general the so-called push-pull control cable durable to the both push and pull loads. There are included in the cable 3 an expansion and contraction-durable, flexible inner wire 4 and a flexible conduit 5 through which the inner wire 4 is slidable. Both ends of the conduit 5 (only one end being shown in FIG. 3) are provided with cap fittings 6, and one of the cap fittings 6 is fixed to the casing 1. The inner wire 4 is fastened to a fastening position 9 provided in the neighborhood of an outer peripheral surface 8 of the drive member 2 by means of a wire end fitting 7 secured to one end portion 4a of the wire 4.

Reference numeral 10 is an annular groove of U-shaped section provided in the periphery 8 of the drive member 2 as shown in FIG. 3, and in this embodiment the depth of the groove 10 is substantially equal to the diameter of the inner wire 4.

Reference numeral 11 is a pinion, and to a drive shaft 12 is secured a steering wheel (not shown). The pinion 11 is meshed with a gear 13 mounted on the drive member 2.

The drive member 2 is rotatably mounted in a casing 1 and its cover 15 by means of an axis 14 of the drive member 2.

Reference numeral 16 is a series of bearings (hereinafter referred to as "bearing means") of a proper length in which a large number of bearings 17 are positioned at approximately equal spaces by a flexible separator 18 in the form of a belt. The bearing means 16 is interposed in a gap 19 between the periphery 8 of the drive member and the inner surface 20 of the casing. The gap 19 extends from a position 21 where the inner wire 4 tangentially contacts with the drive member 2 to a guide path 22 provided in the casing in spaced relationship with or in close vicinity to the inner wire so that the bearing means 16 can enter into the guide path 22 toward its end 22a.

A channel 23 is provided in the casing 1, and through which the inner wire 4 tangentially passes from the tangential contact position 21 into the conduit 5 of the cable 3.

The operation and effects of the present invention will be explained with reference to FIGS. 2, 3, 5 and 7.

The drive shaft 12 may be rotated by means of a steering wheel in either a clockwise or a counterclockwise direction to turn the drive member 2 and to cause the inner wire 4 to wind or unwind about the drive member in the groove 10. Rotation of the pinion 11 secured to the shaft 12 turns the drive member 2 by means of the gear 13 meshed with the pinion 11 in direction of A or B, and causes the inner wire 4 fastened to the fastening position 9 by means of the wire end fitting 7 to wind into or unwind from the groove 10 so as to move the inner wire in a direction of C or D. Upon rotation of the drive member in the direction of A to wind the inner wire about the drive member, the steering wheel can be lightly rotated as in a conventional steering device, since the inner wire closely contacts with the groove 10 in the drive member and does not strongly contact with the bearing means 16 to press against it. Upon rotation of the drive member in the direction of B to unwind the inner wire from the drive member, the inner wire separates from the groove 10 and contacts strongly with the bearing means to press against it, since the push load acts on the inner wire. However, since the bearing means 16 can freely effect movement with rolling of the bearings 17 within the gap 19, the inner wire can be pushed out with little frictional resistance in the direction of D. Since the maximum movement of the bearing means 16 in a direction of A or B with respect to the neutral position of a rudder (not shown) is half the full length of the operation of the inner wire which is necessary to operate a rudder means (not shown), the length of about half the full length of the operation of the inner wire is sufficient for the guide path 22 and the casing 1 does not become large-sized.

Since the bearing means 16 interposed in the gap 19 always contacts lightly with the inner wire 4, the periphery 8 of the drive member and the inner surface 20 of the casing by the elasticity of the separator 18, it always locates at its proper position by the rotation of the drive member 2 in the directions of A and B. Therefore, the operation of the inner wire can be always maintained in a good state, when the bearing means is interposed in the gap 19 at its proper position with respect to the position of the inner wire upon assembling the device.

In the embodiment shown in FIGS. 2 and 3, however, there remains a possibility that the synchronized movement of the bearing means 16 with the inner wire as stated above is not sufficiently effected, for instance, when an alien matter enters into the gap 19. Also, there may occur a case in which the bearing means 16 does not surely move in the direction of E in strict correspondence with the rotation of the drive member, because of the light contact by the elasticity of the separator. Therefore, for instance, if the forward end 16a of the bearing means 16 does not reach near a terminal face 19a of the gap 19 when the forward end of the inner wire reaches the position corresponding to the terminal face 19a, at least the portion near a forward end 4a of the inner wire 4 contacts with the inner surface 20 of the casing 1 to press against it upon unwinding the inner wire 4 in the direction of B and the operation of the inner wire in the direction of D becomes very heavy.

In order to eliminate this problem, there is provided with an engaging means to engage the bearing means with the inner wire or the drive member, thus securing the movement of the bearing means 16 in the direction of E.

Figure 4:
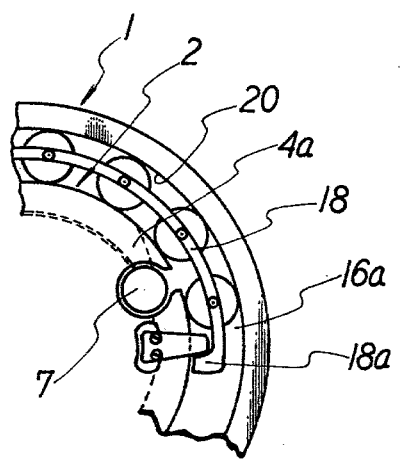
FIG. 4 is a plan view of the main parts of another embodiment of the steering device of the present invention showing the engaging state of the disc drive member with a series of bearings.
Figure 5:
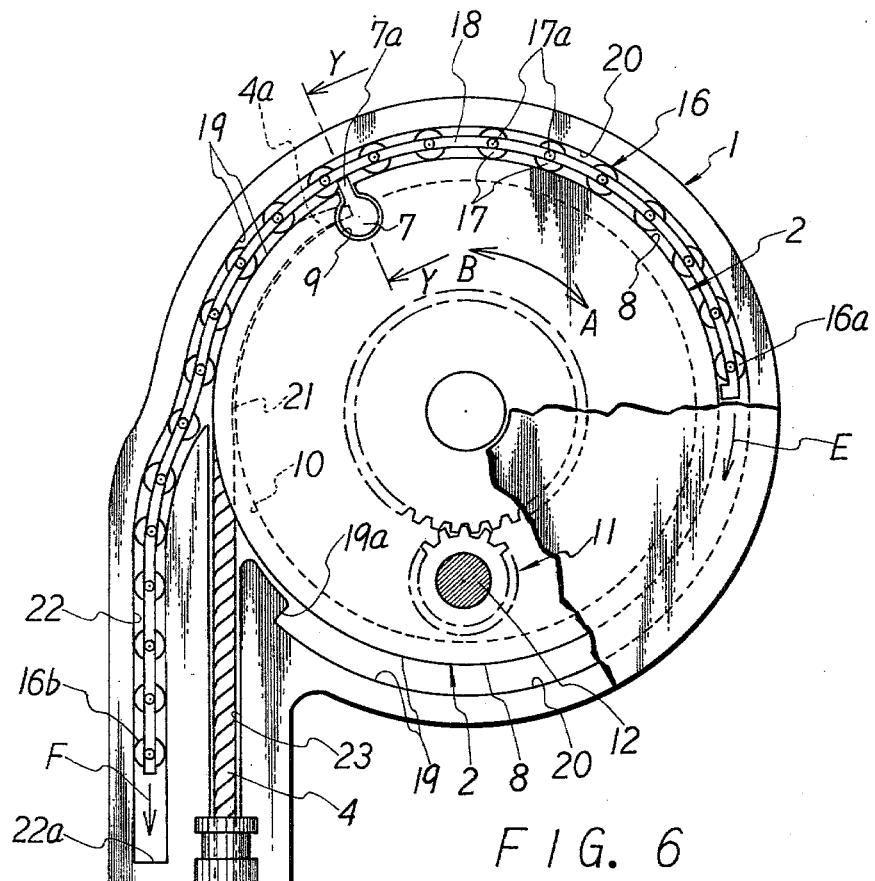
FIG. 5 is a partially cutaway plan view of still another embodiment of the steering device of the present invention showing the engaging state of the inner wire with a series of bearings.
Figure 6:
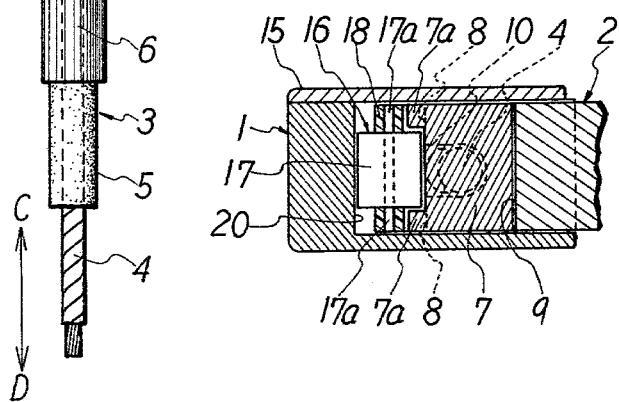
FIG. 6 is a cross sectional view taken on line Y—Y of FIG. 5.
Figure 7:
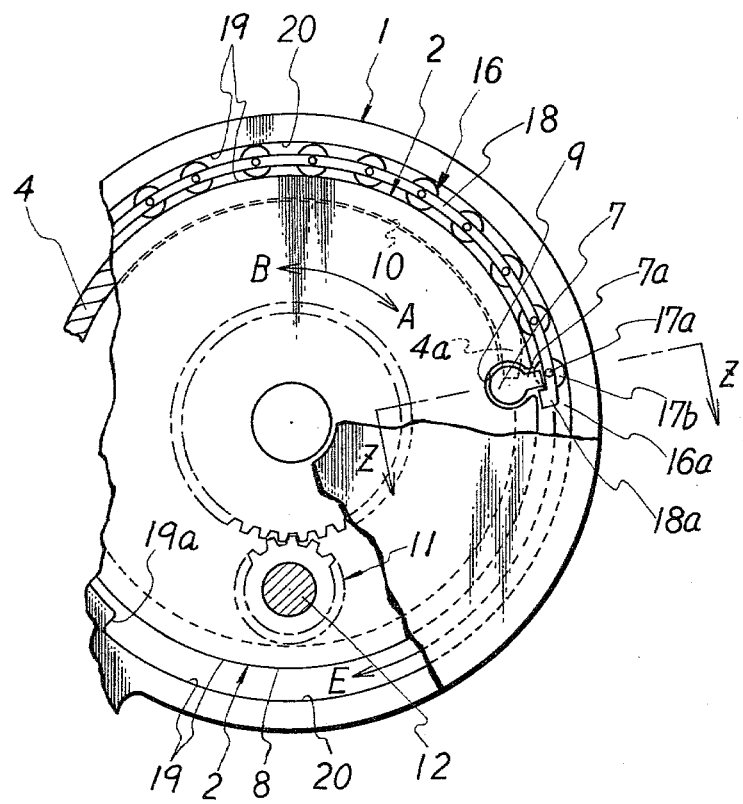
FIG. 7 is a partially cutaway fragmentany plan view showing the operation state of the main parts in FIG. 5.
Figure 8:
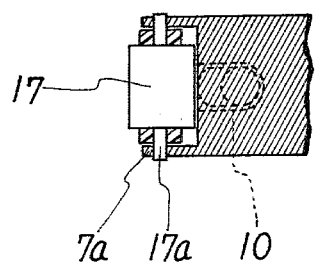
FIG. 8 is a fragmentary cross sectional view similar to FIG. 6 and showing the engaging state of the inner wire with a series of bearings in an embodiment different from the embodiment of FIG. 6.

In FIGS. 4 to 8 wherein the same parts as those shown in FIG. 2 are designated by the same reference numerals and their detailed explanation is omitted, when the forward end 4a of the inner wire 4 approaches to the forward end 16a of the bearing means 16 with the rotation of the drive member to wind the inner wire as shown in FIG. 7, an engaging means 7a provided on the wire end fitting 7 engages with an engaging means 18a provided on the forward end of the separator 18, and with successive clockwise rotation of the drive member the bearing means 16 is brought in the direction of E and the forward end of the separator 18 reaches near the terminal face 19a together with the reaching of the wire end fitting 7. In that case, an engaging means corresponding to the engaging means 7a is not always required to be provided on the wire end fitting 7, and as shown in FIG. 4, it may be provided on the drive member 2, preferably in the neighborhood of the wire end fitting 7. As a result of this construction, the bearing means 16 is always at a good position and the operation of the inner wire 4 in the direction of D by the counterclockwise rotation of the drive member 4 can be lightly conducted by the rolling movement of the bearing means 16. In that case, since the back end 16b of the bearing means 16 can move in the guide path 22 in the direction of F, the operation of the inner wire 4 cannot be, of course, prevented in the direction of D.

Also, the bearing means 16 may be constructed so that the axis 17a of the bearing 17b at the forward end 16a of the bearing means is able to engage with the engaging means 7a of the wire end fitting 7, although this is not shown in Figures.

The apprehension as stated above which remains in the embodiment shown in FIG. 2 can also be eliminated by providing with the following engaging means.

Figure 9:
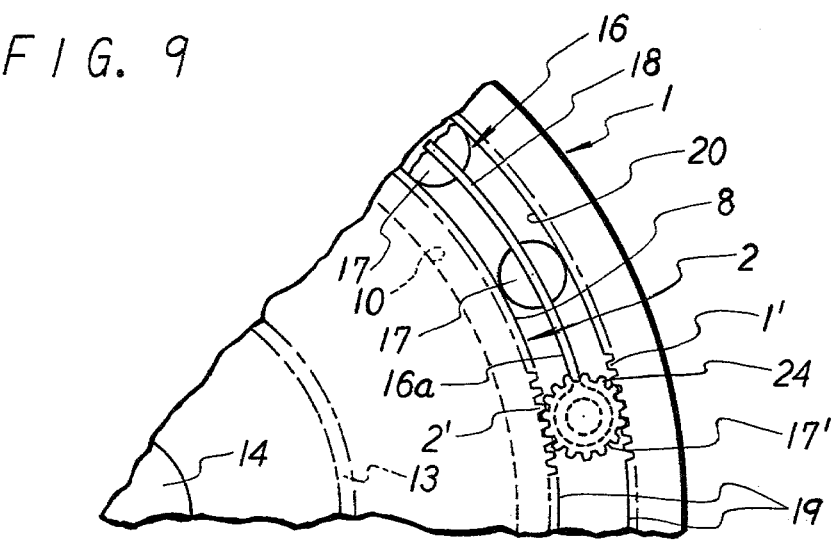
FIG. 9 is an enlarged fragmentary plan view showing another embodiment of the steering device with the cover removed to expose the inner parts, which is different from the embodiments of FIGS. 2 to 8.

In FIG. 9 wherein the same parts as those shown in FIG. 2 are designated by the same reference numerals and their detailed explanation is omitted, the bearing at the forward end 16a of the bearing means 16 is replaced with a bearing 17' having a gear 24 in at least a portion thereof. The gear 24 meshes with a toothed portion 1' provided in the inner surface of the casing 1 and a toothed portion 2' provided in the periphery of the drive member 2, so the bearing 17' effects rotary movement by rotation of the drive member 2. According to this construction, there can be produced an excellent effect that the bearing means 16 can conduct exact movement of half the full length of the operation of the inner wire 4 by the rotary movement of the bearing 17'.

Figure 10:
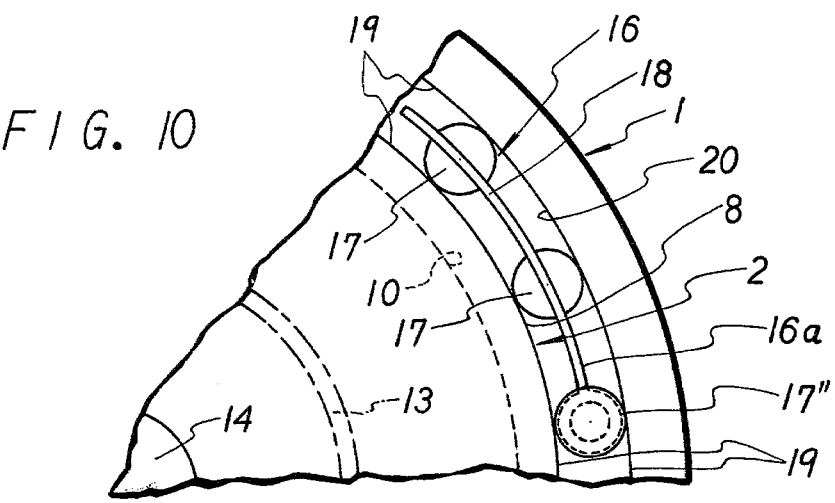
FIG. 10 is an enlarged fragmentary plan view showing still another embodiment of the steering device with the cover removed to expose the inner parts, which is different from the embodiments of FIGS. 2 to 9.

An elastic bearing 17'' made of natural rubber, synthetic rubber, polyvinyl chloride foam, polyurethane foam, etc. is also usable instead of the bearing at the forward end 16a of the bearing means 16 as shown in FIG. 10 wherein the same parts as those shown in FIG. 2 are designated by the same reference numerals and their detailed explanation is omitted. The elastic bearing 17'' has a larger diameter to some extent than the width of the gap 19 between the periphery 8 of the drive member 2 and the inner surface 20 of the casing 1. In this embodiment, both the periphery 8 and the inner surface 20 have the smooth surface as in the embodiment of FIG. 2. Since the bearing 17'' can effect the movement of half the full length of the operation of the inner wire 4 by rotation of the drive member, the bearing means 16 is always at its proper position.

Figure 11:
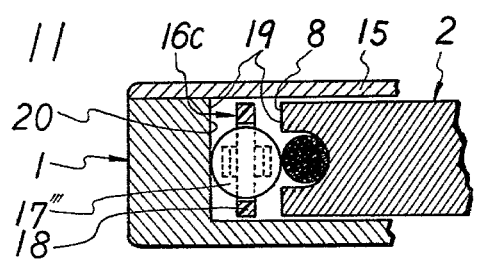
FIG. 11 is a cross sectional view similar to FIG. 3 and showing an embodiment different from the embodiments of FIGS. 2 to 10.

Although the bearing means 16 shown in FIGS. 2 and 3 is composed of a large number of bearings 17 in the form of column, it may be a bearing means 16c composed of a large number of spherical bearings 17''' as shown in FIG. 11 wherein the same parts as those shown in FIG. 3 are designated by the same reference numerals and their detailed explanation is omitted.

Also, a plurality of the bearings 17' having the gear 24 or the elastic bearings 17'' may be provided in the bearing means 16.

The shape and the engaging manner of both engaging means are, of course, not limited to those described herein.

As the material of the separator 18, there may be usable a synthetic resin such as polyamide, polytetrafluoroethylene or polyvinyl chloride. The use of such a separator is advantageous in that a desired length of the bearing means 16 can be obtained by cutting a previously prepared long bearing means. Also, the assembling of the steering device of the present invention is very easy, since it may be done merely by mounting the drive member, the inner wire and the bearing means in the casing.

Although the steering device of the present invention has been explained with reference to particular embodiments, it is to be understood that the invention is not limited thereto and that various changes and modifications may be made in the invention without departing from the spirit and scope thereof.

What is claimed is:

1. In a steering device having a disc drive member rotatably mounted in a casing and an expansion and contraction-durable, flexible inner wire one end of which is fastened to an outer peripheral surface of said drive member, said device being improved in that
    (a) said inner wire is fitted into an annular groove provided in the outer peripheral surface of said drive member,
    (b) a series of bearings located or pivoted by a proper length of a flexible separator is interposed in a gap between the outer peripheral surface of said drive member and an inner surface of said casing,
    (c) one end of the series of bearings is at substantially the same position as the fastening position of said inner wire, when the inner wire is completely wound in said groove about said drive member,
    (d) the other end of the series of bearings is able to enter into a guide path which is provided in said casing so that the series of bearings separates from said inner wire near a tangential contact position of the inner wire with said drive member, and
    (e) the series of bearings is provided with an engaging means at its one end, said engaging means being able to engage with a further engaging means provided on said one end of the inner wire or said drive member at least in the direction of winding the inner wire.

2. The steering device of claim 1, wherein the bearing present at said one end of a series of bearings or at least one of the bearings present at near the forward end portion of a series of bearings is provided with gear teeth in at least a portion thereof, and said gear is meshed with both toothed portions provided in both sides of the gap in which the series of bearings is interposed.

3. The steering device of claim 1, wherein the bearing present at said one end of a series of bearings or at least one of the bearings present at near the forward end portion of a series of bearings is an elastic bearing having a larger diameter to some extent that the width of the gap in which the series of bearings is interposed, and is always pressed by both sides of said gap.

* * * * *